United States Patent [19]

Regan et al.

[11] 3,920,168

[45] Nov. 18, 1975

[54] APPARATUS FOR BREAKING SEMICONDUCTOR WAFERS

[76] Inventors: Barrie F. Regan, 1760 Manor Drive, Hillsborough, Calif. 94010; Glen B. Regan, 1451 Beach Park Blvd. No. 203, Foster City, Calif. 94404; Brent F. Regan, 1760 Manor Drive, Hillsborough, Calif. 94010

[22] Filed: Jan. 15, 1975

[21] Appl. No.: 541,152

[52] U.S. Cl. ................................ 225/103; 225/96.5

[51] Int. Cl.[2] ........................................ B26F 3/00

[58] Field of Search........ B28D/5/04; 225/2, 93, 96, 225/96.5, 103, 104; 29/413; 269/40, 289; 211/128; 312/283, 285; 108/143, 90

[56] References Cited

UNITED STATES PATENTS

| | | | |
|---|---|---|---|
| 1,920,641 | 8/1933 | Heichert | 225/2 |
| 2,609,024 | 9/1952 | Russ | 269/289 X |
| 3,507,426 | 4/1970 | Bielen et al. | 225/2 |
| 3,537,169 | 11/1970 | Eigeman et al. | 225/2 X |

*Primary Examiner*—J. M. Meister
*Assistant Examiner*—Fred A. Silverberg
*Attorney, Agent, or Firm*—Limbach, Limbach & Sutton

[57] ABSTRACT

A method for breaking scribed semiconductor wafers and an embodiment of apparatus for carrying out the method are described. The wafers are broken by placing a pair of thin nonresilient sheets each having a straight end edge on a flat support, one sheet lying above the other and positioned so that the straight end edges of the two sheets are perpendicular to each other, placing the scribed wafer on top of the upper sheet so that the scribe lines are parallel to one or the other of the straight end edges, applying a substantially uniform pressure to the wafer and while maintaining pressure withdrawing the upper sheet so that its straight end edge passes under the wafer and then withdrawing the lower sheet so that its straight end edge passes under the wafer.

3 Claims, 6 Drawing Figures

APPARATUS FOR BREAKING SEMICONDUCTOR WAFERS

BACKGROUND OF THE INVENTION

Microelectronic devices such as integrated circuits require the use of very small semiconductor chips which may be no more than 0.015 inch in transverse dimensions and as little as 0.005 inch in thickness. The production of these chips involves preparing a thin semiconductor wafer, usually circular in outline and being of a diameter of one to several inches. Closely spaced scribe lines are cut in one surface of the wafer. One set of closely spaced scribe lines being perpendicular to a second set of closely spaced scribe lines so that the intersecting lines form a grid of small square or rectangular areas on the wafer surface. The scribe lines are made as narrow as possible and are shallow cuts across the surface of the wafer. The depth of the scribe lines is commonly in the range 0.001 to 0.005 inch so that the scribe line pattern amounts to little more than a grid formed by sets of perpendicular scratches across the surface of the wafer. The wafer itself is brittle and after it has been scribed it is subjected to a breaking routine with a view to breaking the wafer into the individual chips which are outlined by the intersecting sets of scribe lines. In the past, this breaking has been done manually, for instance, by overlaying the scribed wafer with a thin plastic sheet and then running a rounded stylus back and forth across the overlaying sheet to cause fracture of the wafer hopefully along the scribed lines. A number of devices have been contrived to carry out the wafer breaking and for the most part they have involved laying the wafer on a surface which has convex curvature, overlaying the wafer with a plastic sheet and then applying pressure to force the wafer downward so that it is in complete contact with the convex surface. The pressure thus applied causes breaking of the wafer and the breaking occurs in considerable part along the scribed lines. The past methods, however, have been wasteful in that considerable wafer breakage occurs which is not in conformity with the scribe lines and the usual recovery of the described chips is ordinarily in the range about 50 to 70 percent of the recovery that would be obtained if all the breaking conformed to the scribe line pattern.

The method and apparatus of the present invention provide a well controlled wafer breakage that results in recovery of upward of 90 percent of the total wafer in the form of chips conforming in size to the squares or rectangles outlined by the intersecting scribe lines.

BRIEF DESCRIPTION OF THE INVENTION

Pursuant to the method of the present invention, a pair of thin, nonresilient sheets each having a straight end edge are placed on a flat support with one sheet lying above the other and so positioned that the straight end edges of the two sheets are perpendicular to each other. A scribed wafer is placed on top of the upper sheet so that one set of the perpendicular scribe lines is parallel to the end edge of one sheet and the other set of perpendicular scribe lines is parallel to the end edge of the other sheet. A substantially uniform pressure is applied to the wafer through a thin resilient sheet which overlays the wafer. While the pressure is maintained, the upper sheet is slowly withdrawn so that its straight end edge passes under the wafer and then the lower sheet is withdrawn so that its straight end edge passes under the wafer. As the straight end edges pass under the wafer, one after another of one set of the scribe lines comes into register with the end edge of the sheet and the pressure applied through the overlying resilient sheet causes breakage along each successive scribe line.

THE DRAWINGS

DETAILED DESCRIPTION OF THE INVENTION

Figure 1:
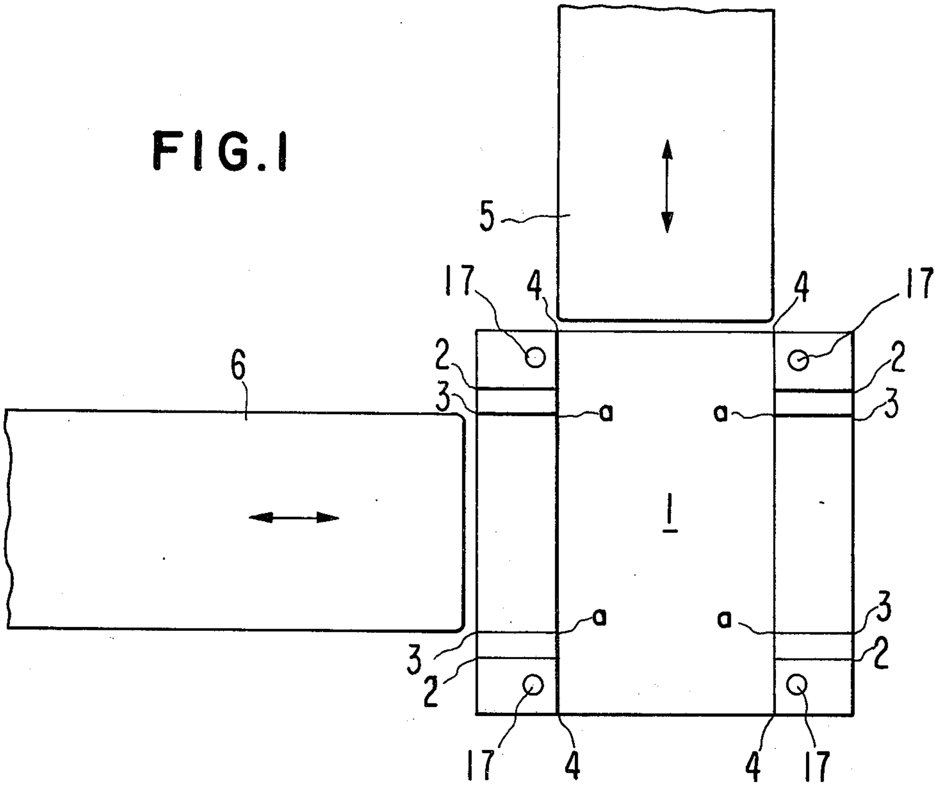
FIG. 1 is a plan view of the base plate of the breaking apparatus.

A preferred embodiment of apparatus for carrying out the wafer breaking method is illustrated in the drawings. FIG. 1 of the drawings is a plan view of the base body of the apparatus showing in addition two shutters which slidably fit into the channels cut in the base body. Base body 1 is a flat metal plate usually from about one-half to one inch in thickness and roughly six inches square. The square shape is convenient but not necessary and the base body could be circular or oval or rectangular so long as the channel arrangement cut into the body is maintained. Threaded holes 17 in the base body permit the top cover section to be bolted to the base body. A first channel defined by 2,2,2,2, is cut through the base body and is sized to receive wafer carrier 7 which is sized to slide backward and forward through the channel.

A second channel defined by 3,3,3,3, narrower than the first channel is cut through the bottom of the first channel and the depth of this second channel is essentially equal to the thickness of shutter 6. Shutter 6 is sized to slide backward and forward through the second channel. A third channel defined by 4,4,4,4, is cut through the base plate perpendicular to the first two channels and its depth measured from the top surface of the base body downward exceeds the depth of the second channel by the thickness of shutter 5. Shutter 5 is sized to fit into the third channel and slide backward and forward through that channel. The leading edges of shutters 5 and 6 are straight and are perpendicular to each other.

It will be noted that the space defined by *a,a,a,a* is common to the three channels so that when shutter 5 is pushed forward into the base body it fills channel 4,4,4,4. When shutter 6 is slid into the base body, it fills channel 3,3,3,3 and overlays the portion of shutter 5 lying in the lower part of the area defined by *a,a,a,a*. When slide carrier 7 is slid into the block, it occupies channel 2,2,2,2 and overlays shutter 6.

Figure 2:
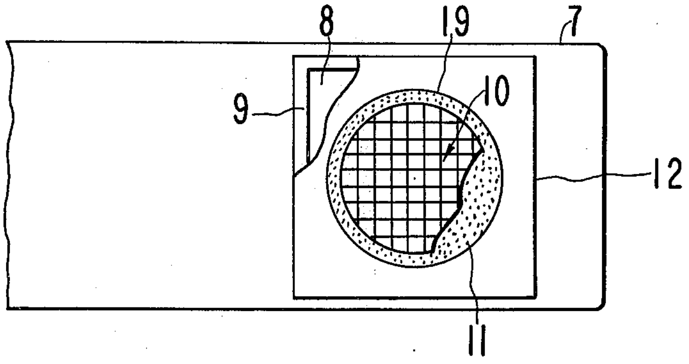
FIG. 2 is a plan view of the carrier for the mounted wafer showing the mounting arrangement in cut-away.

FIG. 2 of the drawings is a plan view of wafer carrier 7. A square opening 8 is cut through wafer carrier 7. A shelf 9 is formed by an indentation in carrier 7 which lies around the periphery of opening 8. Wafer mount 12 is a thin metal square sized to fit snuggly on indented shelf 9. Wafer mount 12 has a circular opening 19 cut through the wafer mount and generally centered in the wafer mount. The diameter of circular opening 19 exceeds the diameter of the wafer to be broken. A tacky plastic sheet 11 is stretched on the lower face of wafer mount 12 covering opening 19. The wafer to be broken 10 is carefully laid down on the surface of tacky sheet 11 so that one set of scribe lines will be parallel to the leading edge of shutter 5 and the other set parallel to the leading edge of shutter 6 when wafer carrier 7 is slid into base body 1 through channel 2,2,2,2. A very thin plastic sheet, such as polyethylene, not shown, is usually laid over the surface of the wafer before the breaking is carried out. This sheet is protective and is held in place by adhesion to the exposed portion of tacky film 11.

Figure 3:
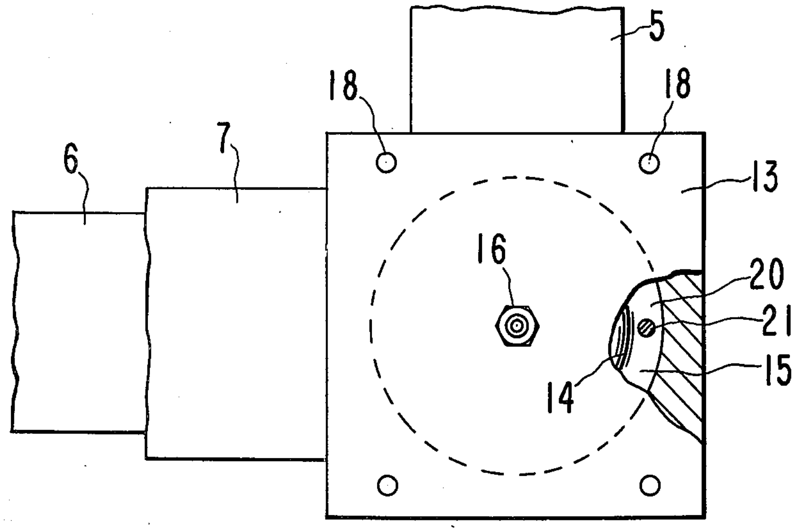
FIG. 3 is a plan view of the top cover body registerable with the base plate.

FIG. 3 is a plan view of the apparatus with the top cover in place showing a part of the interior of the top cover in cut-away. Top cover 13 has threaded holes 18 cut through it to register with threaded holes 17 of the base body to permit the top cover and base body to be bolted or screwed together. Top cover 13 has an air inlet 16 passsing through the upper portion of the top cover and communicating with recess 22 cut into the lower portion of the top cover and shown in FIG. 5. The bottom of the recess is covered by a resilient pressure-responsive sheet 14 which is held by clamp ring 20 which is attached to the lower face of top cover 13 by screws 21.

Figure 4:
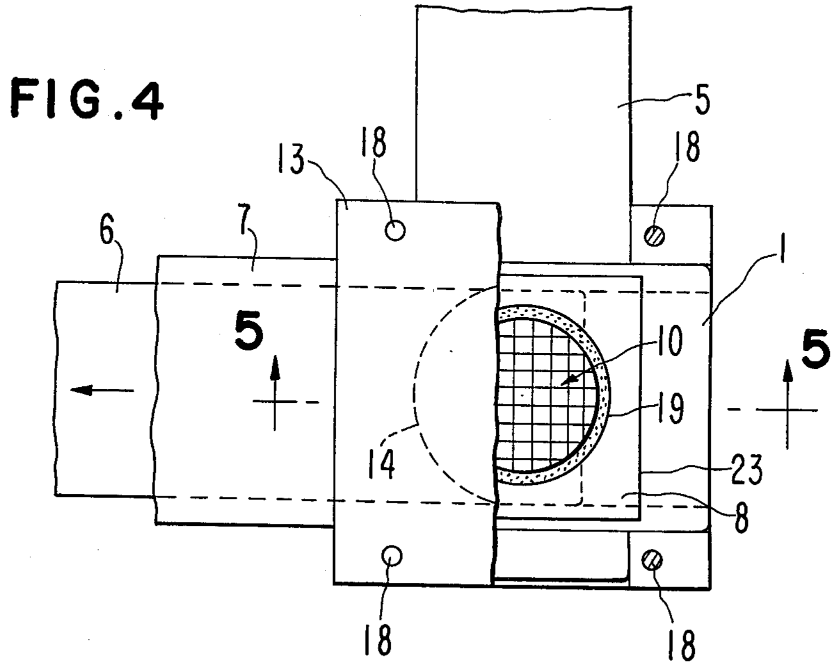
FIG. 4 is a cut-away plan view of the apparatus assembled.

FIG. 4 of the drawings is a plan view of the apparatus assembled showing in cut-away the relative arrangement of the several elements of the assembly previously described.

Figure 5:
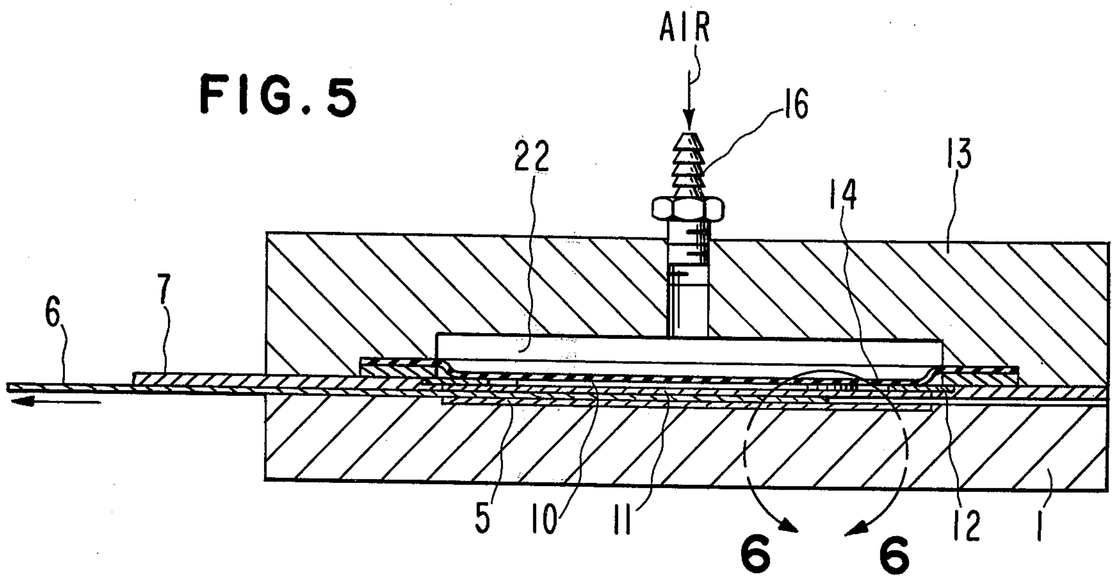
FIG. 5 is a cross-section of the assembled apparatus taken along the line 5—5 shown in FIG. 4.

FIG. 5 is a cross-section of the assembled apparatus taken through the line 5—5 of FIG. 4. Air inlet 16 passes through top cover 13 and communicates with recess 22 in the lower portion of the top cover. Resilient pressure-responsive sheet 14 covers the lower portion of recess 22 and is shown distended by air pressure exerted through air inlet 16. Wafer mount 12 is seated in shelf 9 of carrier 7. Wafer 10 is seated on wafer mount 12. Shutter 6 lies under the mounted wafer and its withdrawal from the base body has been commenced. Shutter 5 underlies shutter 6 and will be left in place until the withdrawal of shutter 6 is complete.

Figure 6:
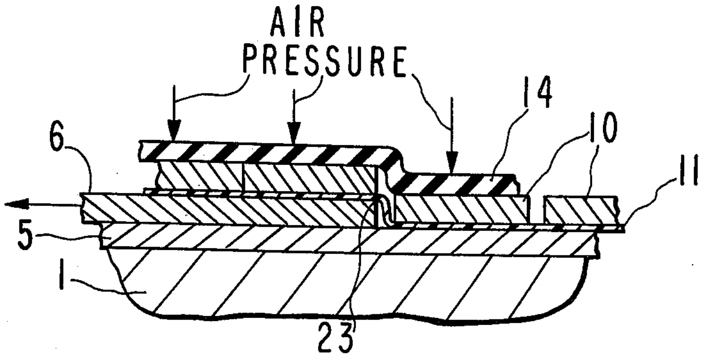
FIG. 6 is a cut-away cross-section showing the condition of the interior of the apparatus as one of the nonresilient shutter sheets is being withdrawn.

FIG. 6 is an expanded cross-sectional view of the apparatus as the breaking of the wafer along one set of scribe lines is being carried on. Shutter 6 is being withdrawn and its end edge 23 lies below the central portion of wafer 10 which is adhering to tacky film 11. Air pressure exerted on the resilient pressure-responsive sheet 14 forces the sheet downward firmly against the wafer and as end edge 23 of shutter 6 passes under one after another of the scribe lines on the wafer which are parallel to end edge 23, sheet 14 exerts a pressure against the face of the wafer which causes it to break smoothly along the scribe line. Shutter 5 is shown underlying shutter 6 and it will remain in place until the withdrawal of shutter 6 is complete.

The base body and top cover are preferably constructed from a metal such as steel or stainless steel which can be precisely machined. Shutters 5 and 6 are also preferably constructed of a hard metal such as steel or stainless steel and are generally of a thickness ranging from about one-half to two times the thickness of the wafer to be broken. Ordinarily, the shutter thickness is in the range 0.005 to 0.015 inch.

The resilient pressure-responsive diaphragm 14 may be constructed from a moderately hard rubber sheet or from a synthetic elastomer such as a polyurethane resin.

Tacky film 11 on which the wafer to be broken is placed may be almost any thin polymer film overlaid with a thin coating of an adhesive. Polyethylene, polypropylene, nylon, polyester films and the like are suitable. Commercially available films for use in scotch taping are also satisfactory.

OPERATION OF THE APPARATUS

The top cover and base body are bolted together as shown in cross-section in FIG. 5. Shutters 5 and 6 are slid into channels 4,4,4,4 and 3,3,3,3, respectively, of the base plate, shutter 5 unlying shutter 6 and both shutters extending into the base plate at least far enough to cover area *a,a,a,a.* One face of wafer mount 12 is covered with a plastic film and wafer 10 is then carefully set down on the film so that one set of scribe lines will be parallel to end edge 23 of shutter 6 and the other set parallel to the corresponding end edge of shutter 5. The wafer mount is then set on shelf 9 of carrier 7 and carrier 7 is slid into channel 2,2,2,2 to the point where wafer 10 is generally centered in area *a,a,a,a.* Air is then introduced through air inlet 16 at a pressure in the range about 5 to 100 pounds per square inch. Shutter 6 is then withdrawn from base body 1 at a rate ordinarily in the range of 0.25 to 2 centimeters per second. As shutter 6 is withdrawn, the wafer is broken along the scribe lines which are parallel to its end edge. After the withdrawal of shutter 6 is complete, shutter 5 is then withdrawn at the same rate and the wafer is broken along the scribe lines parallel to the end edge of shutter 5. When withdrawal of shutter 5 is complete, the air pressure is released and carrier 7 is withdrawn from the base plate, wafer mount 12 is removed from the carrier, the thin non-tacky plastic sheet which is ordinarily used to overlay the wafer is removed and the tacky film 11 is cut around the periphery of opening 19 and removed. Alternatively, tacky sheet 11 can be stripped away from the metal frame of wafer mount 12 intact with the chips resulting from the breaking of the wafer adhering to it undisturbed. The number of useful semiconductor chips produced in the breaking process is upward of 90 percent of the number theoretically possible.

The movement of shutters 5 and 6 and of carrier 7 into and out of the base body and also the application and release of pressure on resilient diaphragm 14 can readily be machanised so that the sequence slide 5 in, slide 6 in, carrier 7 in, pressure on, slide 6 out, slide 5 out, pressure off, and carrier 7 out occur in sequence. This sequence of steps ordinarily consumes between one and one-half and two minutes during which time the operator of the apparatus can mount another wafer and have it ready for placement on shelf 9 of carrier 7 as soon as the broken wafer is removed and then the sequence of steps is repeated.

What is claimed is:

1. Apparatus for breaking scribed semiconductor wafers comprising a. a generally flat base body having a first flat bottomed rectangular channel cut through its top surface, b. a second flat bottomed rectangular channel narrower than said first channel cut through the bottom of said first channel, c. a third flat bottomed rectangular channel cut through the base body perpendicular to said second channel and having a depth slightly greater than that of said second channel, d. a first thin rectangular shutter slidably fitted in said third channel, e. a second thin rectangular shutter slidably fitted in said second channel and overlaying said first shutter, and f. a rectangular carrier slidably fitted into said first channel, said carrier having an opening in the end entering the base body adapted to receive a mounted wafer.

2. Apparatus as defined in claim 1 having a thin pressure-expandable resilient sheet covering the opening in the rectangular carrier.

3. Apparatus as defined in claim 1 having a. a cover body registerable with the base body, b. said cover body having a recess in its bottom face, c. said recess having a cross-sectional area at least equal to that of a mounted wafer, d. a thin resilient pressure-expandable sheet covering the recess opening in the lower face of the cover body, and e. a gas inlet passing through the upper face of the cover body and communicating with the recess therein.

* * * * *